March 11, 1969         E. BASSANI         3,432,727
ELECTRONIC WIRING DEVICES FOR ELECTRIC PLANTS
Filed April 10, 1967                    Sheet 1 of 5

Ermanno Bassani
INVENTOR
BY Michael S. Striker
ATTORNEY

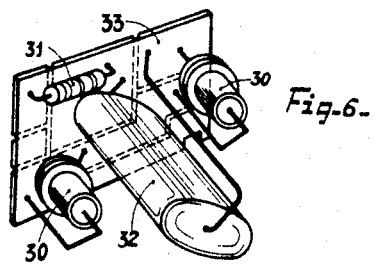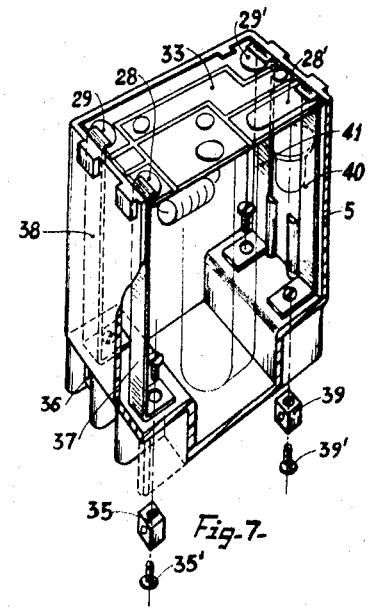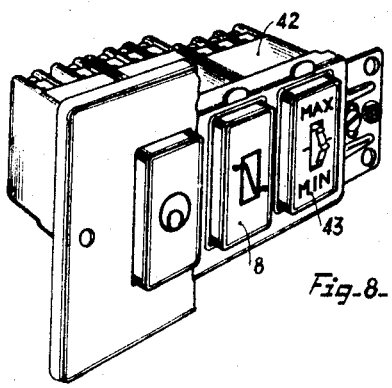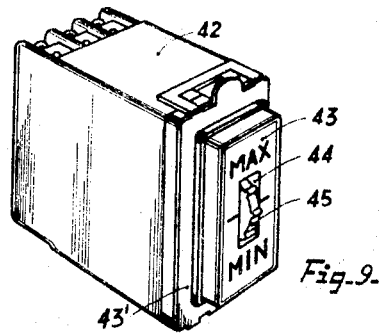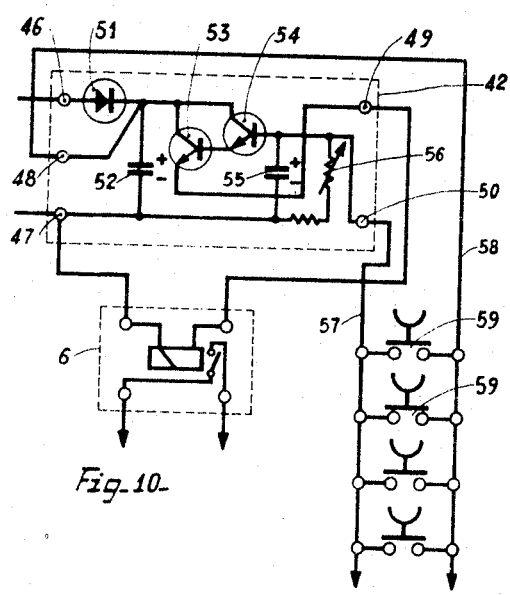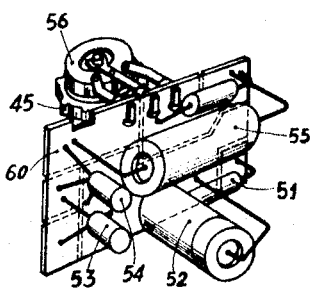

March 11, 1969　　　　E. BASSANI　　　　3,432,727
ELECTRONIC WIRING DEVICES FOR ELECTRIC PLANTS
Filed April 10, 1967
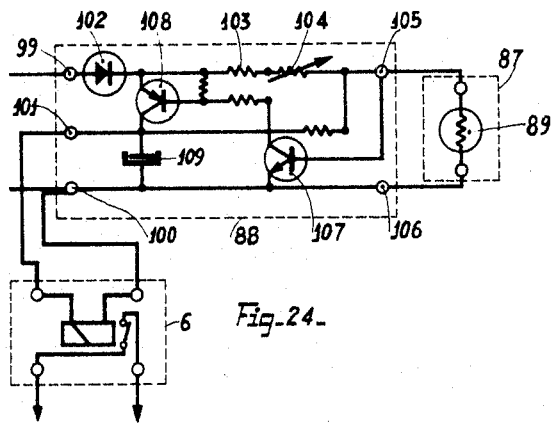
Fig.-24-
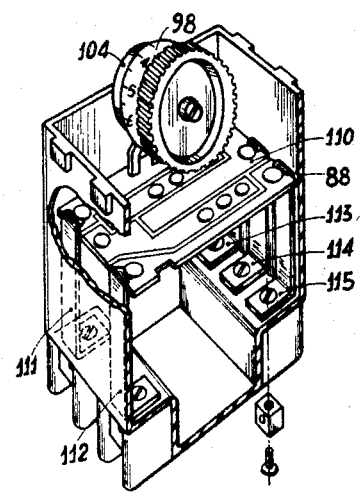
Fig.-23-
Ermanno Bassani
INVENTOR
BY Michael S. Striker
ATTORNEY United States Patent Office 3,432,727
Patented Mar. 11, 1969

3,432,727
ELECTRONIC WIRING DEVICES FOR ELECTRIC PLANTS
Ermanno Bassani, Corso di Porta Vittoria 9, Milan, Italy
Filed Apr. 10, 1967, Ser. No. 629,593
Claims priority, application Italy, Apr. 12, 1966, 8,306/66
U.S. Cl. 317—99    9 Claims
Int. Cl. H02b 1/04, 1/10

ABSTRACT OF THE DISCLOSURE

An electronic circuit arrangement in which portions of the circuit are contained within separate modular housing. The modules are stacked and spaced relative to each other by a mounting plate which holds in place the modules. The mounting plate may, in turn, be secured to a utility outlet box inserted into a wall opening. The bulk of each module projecting from one side of the mounting plate extends into the interior of the box and thus into the wall in which the box resides. Each module is equipped with terminals so that the different modules may be interconnected to form a desired circuit. Within any one module may be a relay, an amplifier, a voltage reducer, and a sensing element.

---

This invention relates to electronic wiring devices to be used in so-called domestic plants for the general distribution of electric energy with the view to improve the convenience or output of the same.

More particularly, this invention involves electronic wiring devices and accessories enclosed within apparatus interchangeably mounted on the known supporting frames to be encased into walls, with the purpose to enhance the number of services obtainable from said electric energy distributing plants, with the advantage that such wiring devices can be mounted and combined very quickly without any necessity to predispose a plant separately provided from that one already in place and use.

According to the invention, a complete electronic circuit known per se is enclosed into electric wiring devices to be mounted in interchangeable manner onto a supporting frame, the subdivision being made so that a first such wiring device contains a voltage reductor, another such device or two such wiring devices enclose an electronic element responsible to a physical information to be controlled or relieved, and an amplifier enable to amplify the signal emitted by the responsible means, while a furthere electric wiring device comprises an electromagnetic relay fed through said amplifier.

Partakes the invention the particular realisating concept of a whatever electronic circuit inasmuch as, although of the fact of utilising already known circuits, the invention is grounded on the use of new wiring devices and accessories which are in condition to reach performances not obtainable from the technique in the branch.

The essence of the invention will be more promptly understood by reading the hereinunder reported specification of it in reference to the enclosed drawings, the whole given without any purpose to limit solely to the illustrated and described examples of embodiment its application. In said drawings:

FIGURES 6 and 7 are some steps of realisation of the voltage reductor of FIGURES 4 and 5;

FIGURE 8 represents a combination of a voltage reductor and of a relay together with a timer;

FIGURE 9 shows a view from the external of said timer of FIGURE 8;

FIGURE 10 represents the electric diagram of the timer of FIGURE 9;

FIGURES 11 and 12 are a constructive example of the timer of FIGURE 10;

FIGURES 21, 22 and 23 are respectively in view from the external and according two successive steps of the construction of the amplifier receiving the signal from said thermoresistor, and FIGURE 24 shows the electric diagram of the combination of FIGURE 18.

Figure 1:
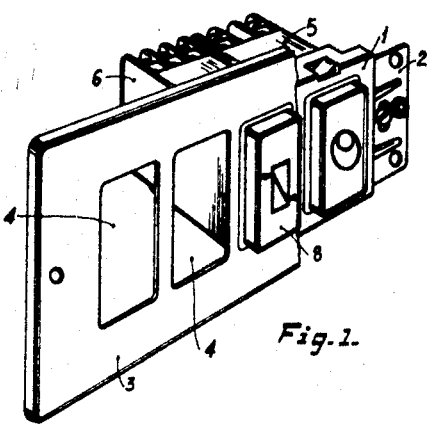
FIGURE 1 is a generical but not complete combination wherein there are only indicated the elements which generally comprise every combination.

Referring now to FIGURE 1, it is known art to mount apparatus for electric plants, such as switches, commutators, sockets, signalling lamps, fuses, etc. in the shape of wiring devices provided with anchoring members to be mounted in combination onto a supporting element 1 shaped as a frame and provided with further members 2 for their connection with a supporting housing encased in a wall whatever. Said frame and the apparatus thereon mounted are covered by a covering plate 3 provided with windows 4 through which the operative means of the wiring frame with the purpose to use electronic wiring devices of a switch, the entrance of a socket, the transparent portion of a signalling lamp, etc. are projecting.

This invention is grounded on the use of said known apparatus and of their anchoring means on a supporting frame with the purpose to use electronic wiring devices in an electric energy distributing plant to the end to enhance the number of services obtainable from said distributing plant, without any necessity to make use of particularly and separately such plants expressly provided for.

According to this invention, an electronic circuit, provided for sensing or regulating a determined physical unit, is divided so as to be contained in more than one wiring devices disposed side-by-side and to be mounted onto a frame 1 in the same manner as in cases of electric devices of installation.

Whatever may be the electronic circuit used, the same will be devised so as to comprise a wiring device 5 composed of a voltage reductor provided for feeding said circuit at the required voltage, and a wiring device 6 containing an electromagnetic relay, capable of acting upon the electric circuit of an operative means. Such a disposition common to whatever combination allows to make use of the line voltage of the electric distributing plant, without any necessity to make recourse to a low voltage circuit for the constitution of the required electric plant.

Figure 2:
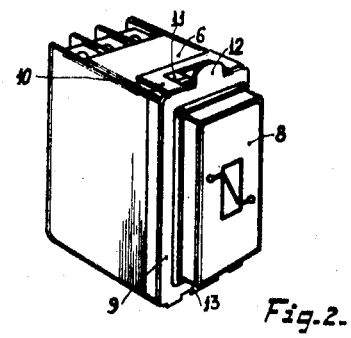
FIGURE 2 is a external view of a wiring device comprising an electromagnetic relay.

Wiring device 6 (FIGURES 2 and 3), which contains the electromagnetic relay, is constituted by an external housing closed at its front part by means of a cover 8 fastened to the housing by means of a collar 9, which in turn is fixed at the side portions of the housing 7 by means of stirrups 10 which engage under the side portions of projections 11 at the external of said housing. Collar 9 shows end tongues 12 and 13 by means of which the same may be fixed to the frame 1 in FIGURE 1, thus allowing the setting up of the wiring device 6.

In its inner part, said wiring device 6 encloses an electromagnetic relay comprising a small coil 14 wound around a bobbin 15 of insulating stuff and provided with an axial recess wherein a core 16 is placed. Said coil is supported by a supporting means 16' projecting from the bottom of the wiring device, whereon it is fixed by means of a screw. Said coil, when excited, moves a core 17 which, on rest, is in turn excited by a lamellar spring 18. Said core 17 is prolonged upwards, at the side of coil 14, in order to bear at its upper end a follower 19 acting upon a lamella 20 bearing the mobile contacts of the wiring device, so that the last can be brought into contact with the fixed contacts presented by conductive laminae 21 and 22 disposed at the one and the other side portion of said coil 20.

Figure 3:
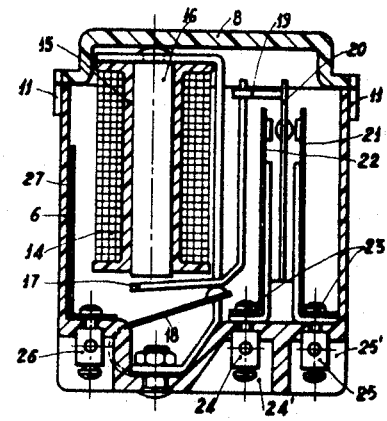
FIGURE 3 is the cross cut in enlarged scale of the wiring device of FIGURE 2.

Laminae 21 and 22 are fixed at the base portion of the housing 7 by means of respective screws 23, electrically connected with external terminals 24 and 25, to which are connected in turn the relating electric leaders. Said terminals 24, 25 are lodged, as shown in FIGURE 3, in recess respectively 24' and 25' foreseen at the external of the housing body.

For feeding the coil 14, there are used further terminals 26 (of which only one is visible) serving to connect the feeding leaders for said coil. Said terminals are electrically connected to respective internal laminae 27, to which the ends of said coil 14 are in turn connected.

Figure 4:
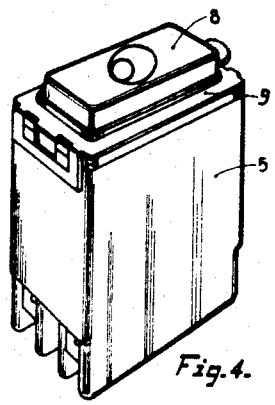
FIGURE 4 is a wiring device for voltage reduction.

The voltage reductor 5 (FIGURE 4) also comprises an external housing which is closed by a cover plate 8 fixed to the collar 9. The circuit of said voltage reductor (FIGURE 5) comprises two terminals 28 and 29 connected to the distributing line, while two ends 28' and 29' are in turn connected to the electronic circuit to be fed. Between the leaders connecting the ends 28 and 28' and the ends 29 and 29' there are derived one or more diodes 30 connected in series connectioin of the kind of constant voltage, known in the art as Zener diodes. On the leader which connects the ends 28 and 28' there are still a limiting and a condenser 32 connected in series connection one another. Of course, when an A.C. voltage is applied at terminals 28 and 29, a first half-wave, f.i. of positive potential, will be left to pass until its potential will have reached the threshold voltage of diode 30 or the sum of the threshold voltages of more diodes. At this point, the half-wave will remain levelled at the potential of the threshold voltage, this being the result of the short-circuiting action of said diodes 30, for which at the terminals 28' and 29' there will be a reduced voltage caused by said threshold voltage. The other half-wave will be entirely shortcircuited or it will be levelled by inserting a further diode which will be oriented in opposition to the preceding one.

The practical realisation of the wiring device comprising the voltage reductor is shown in FIGURES 6 and 7. As shown in FIGURE 6, diodes 30, the electric resistor 31 and the condenser 32 are inserted by means of a printed circuit, constituted by a plate 33 provided with an electrically conductive surface coating accordingly corroded. The components of said circuit are set on the electrically nonconductive surface, in accordance with the known technique of the printed circuits.

Plate 33 is inserted in the internal of the wiring device 5 in such a mode that the elements from 30 through 32 are turned, against the bottom of the housing. The inlet terminals 28 and 29 are connected to lower terminals 35 and 36, respectively, by means of vertical laminae 37 and 38 leaning against a wall of the wiring device housing, and with their upper ends directed over the borders of plate 33 in order to be soldered thereon.

In the same manner, ends 28' and 29' are connected to lower terminals 39 by means of vertical laminae 40 and 41, respectively, the same having also their ends directed over said lamina 33 in order to be soldered thereon.

As it may be seen in FIGURE 7, the laminae 37, 38, 40 and 41 serve, besides as electric conductive means, to support and fixed by mechanical ways said plate 33 together with the components connected to it.

Of course, it appears evident that, when the wiring devices 5 and 6 have been set in place on a supporting frame, it is a matter of larger simplicity to provide for their connection with external electric leaders, which are tightened on the external terminals by means of opportune screws, such as screws 35' and 39'.

It is further evident that the wiring devices 5 and 6, although they contain both electric and electronic members of known kind, they constitute in their whole new electric apparatus by means of which whatever controlling or regulating electronic circuit of a certain physical amplitude are obtained so that the wiring device 5 will feed said electronic circuit at the required voltage, while the wiring device 6 will be controlled by the same circuit itself.

An example of such a combination is represented in FIGURE 8, wherein the voltage reductor and the relay are combined with a timing device, called timer, 42. Such a combination can for instance be used to control the lighting time of determined place, such as stairs, entrances or the like.

The timer 42 is shown in front view from the external of FIGURE 9. As it may be seen, it is enclosed within a similar housing of that of the apparatus precedingly described, with but the sole difference that on the front cover 43 there is foreseen a window 44 from which a handle 45 projects, the same serving to control the variable resistor of said timer.

The timer circuit is illustrated in FIGURE 10. As it may be noted, said circuit shows three entrance terminals 46, 47 and 48 and two outlet terminals 49 and 50. The circuit still comprises a rectifier 51 and a levelling condenser 52, these means being used to rectify an electric current serving to feed said timer. Terminals 46 and 47 are connected to outlet terminals 28' and 29' of the voltage reductor of FIGURE 5 for which said rectifier is fed with an already reduced voltage.

The circuit further comprises two transistors 53 and 54 and a condenser 55 connected in parallel connection with a variable resistor 56.

From terminal 48 and terminal 50 two leaders 57 and 58 depart, whereon more switches controlled by means of pushing buttons 59 are connected in parallel connection.

The inlet terminal 47 and the outlet terminal 49 are connected with the coil of the hereabove described relay 6.

At the instant at which a pushing button 59 is pressed down, voltage is sent to the base of transistor 54, which due to its initiation to conduct electricity, sends in turn voltage to the base of transistor 53, through its emitter thus making it conductive and consenting feeding of the relay 6. On making said pushing button 59 free again, the condenser 55 will maintain the transistors 54 and 53 in conductive state, while condenser 55 will discharge progressively under the control of said variable resistor 56 to regulate the time of this operation. Of course, the pushing buttons 59 can be placed at a certain distance from the point wherein said timer is inserted.

When the voltage at the ends of said condenser 55 diminishes more than a prescribed threshold potential, said transistors will be brought into the state of interdiction, consequently eliminating any feeding for the relay 6.

Figure 12:
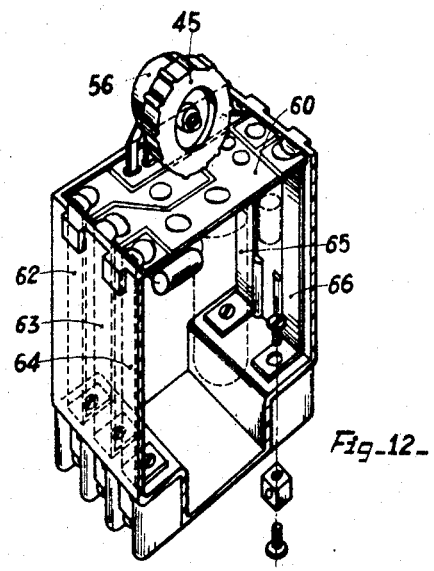

In FIGURES 11 and 12 there are illustrated two construction steps of the timer of FIGURES 9 and 10.

Also, in this case, the constructive members are inserted on a printed circuit constituted by a plate 60. On the not conductive face of said plate 60 there are provided both the transistors 53 and 54, both the condensers 52 and 55 and the diode 1 as well, while, on the other face, which is the conductive face of said plate, there is disposed the variable resistor 56 provided with the controlling handle 45.

Said plate thus constituted is inserted into the internal of the wiring device 42 and with the composing elements of the circuit directed downwards, while the variable resistor 56 is turned upwards. The ends of the circuit are connected to lower terminals by means of respective vertical laminae 62, 63, 64, 65 and 66, the ends of which reach the upper portion of the small plate 60 so as to be soldered thereon. After this operation, cover 43 is fixed in place by means of collar 43' (FIGURE 9) and the wiring device is now ready for its utilisation.

Figure 13:
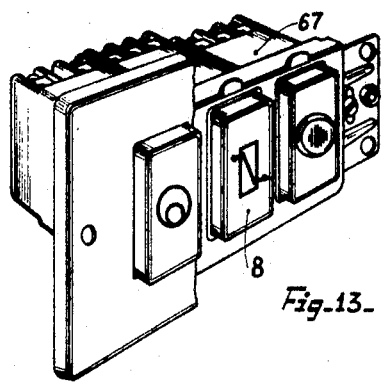
FIGURE 13 represents a combination of the voltage reductor and the relay together with a photoelectric amplifier.
Figure 14:
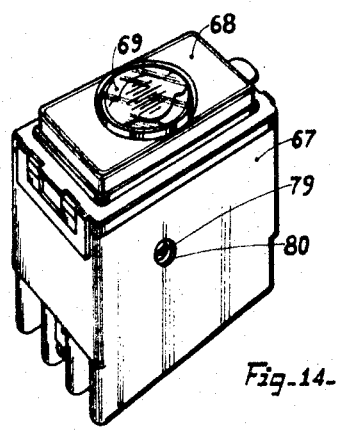
FIGURE 14 shows a view from the external of said photoelectric amplifier.

The example of FIGURE 13 relates to a combination comprising a wiring device 67 wherein a photoelectric amplifier is inserted. Said wiring device 67 is illustrated in FIGURE 14. It is closed by means of a cover 68 showing a hole from which a photoelectric resistor 69 projects.

Figure 15:
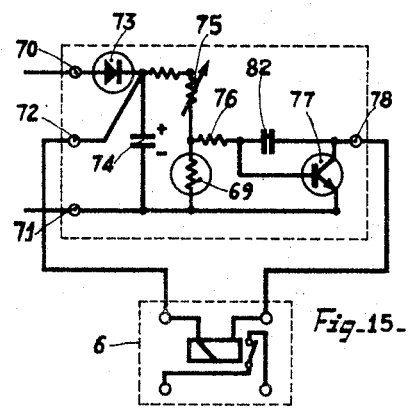
FIGURE 15 shows the complete electric diagram of said photoelectric amplifier.

The circuit of such an amplifier is shown in FIGURE 15. It comprises two inlet terminals 70 and 71 connected to the voltage reducer of FIGURE 5, and further to an inlet intermediate terminal 72. This intermediate terminal is connected in upstream position, in respect of a rectifier 73, and to one of the ends of the coil of relay 6. Said rectifier 73 is combined with a levelling condenser 74, while upstream of it there is foreseen a variable resistor 75 connected in series connection with said photoelectric resistor 69. Between the variable resistor 75 and said photoelectric resistor 69 there is derived a fixed resistor 76 connected to the base of a transistor 77. This transistor 77 is inserted between an outlet terminal 78 and the negative leader of the circuit. The same terminal 78 is connected to the second end of the coil of relay 6.

The operation of said circuit is as follows:

When the photoelectric resistor 69 is illuminated, f.i. by the daylight, its conductivity is increased; in such a condition, the current flows across the variable resistor 75 and through the photoelectric resistor 69 as well; there is thus obtained through the variable resistor 68 a drop of voltage such as to cannot be transmitted to the base of transistor 77 a voltage of sufficient potential in order to have said transistor conductive; when, on the contrary, f.i. at the event of the evening, the conductivity of the photoelectric diminishes, this limits considerably the flowing current; consequently, there will be at the variable resistor 75 a minor drop of voltage, for which there will be sent to the base of transistor 77 a major voltage capable of putting said transistor in state of conductivity, so as to allow to feed electric current to relay 6, which will thus be excited.

As shown in FIGURES 14 and 15 the regulation of the electric resistor 75 takes place by means of a screw 79 passing through a hole 80 on a face of the wiring device 67.

The combination of FIGURE 13 can be used for instance to provide the automatic lighting of illuminating lamps at the external as evening initiates.

Figure 16:
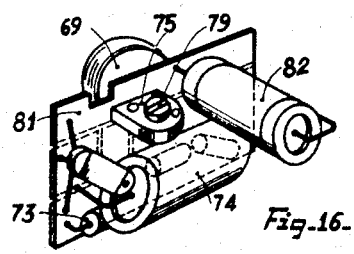
FIGURES 16 and 17 show of it some constructive steps.
Figure 17:
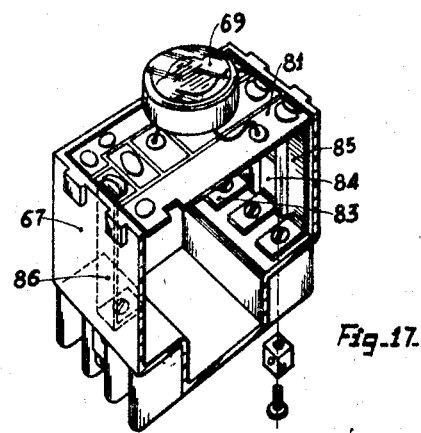

FIGURES 16 and 17 relate to two steps in the manufacture of the photoelectric amplifier described hereinabove. Even in this case, the composing members of the present electric circuit are set on a plate 81 having an electrically conductive face. On the nonconductive face of said plate there are mounted the rectifier 73, the levelling condenser 74, the variable resistor 75, with the respective regulating screw 79; the condenser 82, the function of which is to retard the intervention of the closing relay, and the further members, while on the conductive face the photoelectric resistor 69 is in its proper place. The so composed plate is introduced into the internal of the wiring device 67 with the photoelectric resistor 69 projecting upwards. The terminals of the circuit are connected by means of vertical laminae 83, 84, 85 and 86, the upper ends of which are turned so as to be fastened over the lamina 81 by means of soldering.

Figure 18:
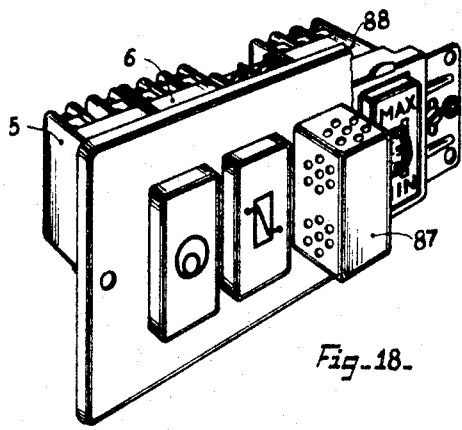
FIGURE 18 is a combination comprising an electronic circuit for temperature control of a means or in a room.

FIGURE 18 refers to a further combination which comprises together with the voltage reductor 5 and the relay 6 a thermostatic apparatus subdivided in two wiring devices 87 and 88 responsible to and for the regulation of a room temperature.

Figure 19:
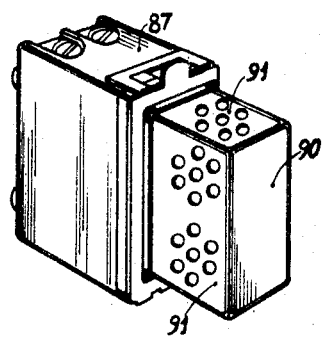
FIGURES 19 and 20 represent in external view and in cross cut the wiring device containing the thermoresistor comprised within said circuit for temperature control.
Figure 20:
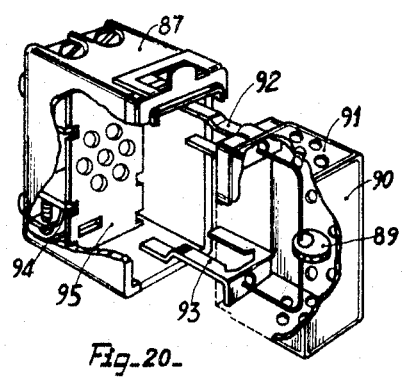
Figure 21:
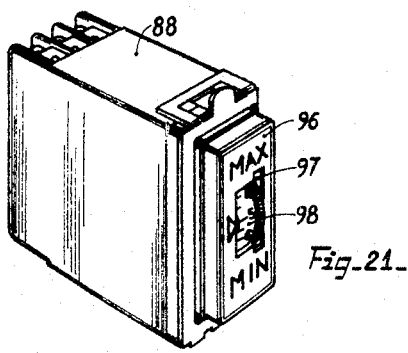

Within the device 87, as FIGURES 19 and 20 show, there is enclosed a thermo-resistor 89, which is enclosed in a cap 90, widely projecting from said wiring device 87 and provided with perforated walls 91, 91 in order the thermo-resistor 89 is allowed to feel the inner temperature of the room. Said cap is connected at the bottom of said wiring device by means of conveniently bent lamellae 92 and 93 which also act as connecting pins for the electric connection.

Said lamellae do contact with the sockets 94 disposed at the bottom of the wiring device after having accordingly traversed respective holes provided in the insulating wall 95, so that, by means of external rear terminals, said thermo-resistor 89 can be connected with the side-by-side disposed next wiring device 88 containing an amplifying circuit of the electric signal sent to said thermo-resistor 89.

Wiring device 87 resembles externally the other wiring devices as hereinabove described and illustrated and presents a closing cap 96 provided with a window 97 from which and crossing it a graduated handle 98 projects outside, the purpose of which is to serve for controlling a variable resistor.

FIGURE 24 represents the electric diagram of the entire apparatus for the purpose of thermal regulation and comprised within the wiring devices 87 and 88.

Figure 5:
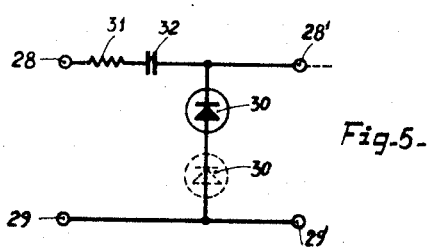
FIGURE 5 shows the electric diagram contained therein.

Said circuit comprises two inlet terminals 99 and 100, connected to the voltage reductor of FIGURE 5 and a third inlet terminal 101 which is connected to an end of the coil of relay 6. The same circuit further comprises a rectifier 102, a fixed resistor 103, and a variable resistor 104 connected to an outlet terminal 105.

To the same outlet terminal there is but also connected one of the two ends of the thermo-resistor 89, while the other end of last is connected to a further outlet terminal 106 of the negative conductor of the circuit.

To the outlet terminal 106 there is connected the base of a first transistor 107, the collector of which is connected to the base of a second transistor 108 in shunt connection downstream said rectifier and the function of which is to feed a utiliser as f.i. relay 6 across terminal 100.

Suppose that the variable resistor 104 has been controlled with the view to maintain a room at a pre-established temperature, when said temperature reaches a higher level, the thermo-resistor 89 is submitted to a higher conductibility, for which across the resistors 103 and 104 there will flow such an electric current that a voltage drop will take place in these resistors, so that one will have at the base of transistor 107 a voltage which will not be sufficient to bring said transistor into conductive state.

When the room temperature decreases and attains a level underneath that one pre-established, the conductivity of the thermo-resistor 89 will also decrease so that less current will flow therein, and minor also will be the voltage drop through resistors 103 and 104. Consequently, at the base of transistor 107 there will be established a voltage capable of rendering said transistor conductive.

Transistor 107 in turn makes the transistor 108 conductive thus allowing feeding of relay 6.

In parallel connection with relay 6 there is a condenser 109 the purpose of which is to provide levelling of the exciting current of relay 6. Thus, the relay 6 will be put into such a condition as to act upon an element or an apparatus enable to influence the room temperature, f.i. a gas or oil burner.

Figure 22:
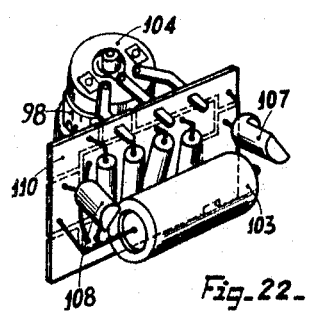

FIGURES 22 and 23 represent some construction steps of the apparatus of FIGURE 24. Also in these cases all the members of the wirings will be set onto the nonconductive surface of the plate 110, while on the other face the variable resistor 104 is disposed in coupling combination with the controlling knob 98.

The so predisposed equipment is introduced into the internal of the wiring device 88 until a certain depth and with the said controlling knob directed upwards. The plate is connected to external terminals by means of conductive laminae 111, 112, 113, 114 and 115, as in the preceding cases.

Evidently, as the subdivision of an electronic circuit can be made in several wiring devices mountable and interchangeable on a supporting frame 1, there are also further possibilities of combination of means responsible to the conductivity of a fluid, to indicate a liquid level, the presence of a determined gas, as carbon dioxide or the like. All these combinations or equipments represent a simple and quick utilisation of the teachings of this invention.

What I claim is:

1. An electronic circuit arrangement comprising, in combination, a relay module with electromagnetic coil and contact springs actuated through energization of said coil; a voltage reducer module with a diode connected across the output and a capicitor connected in series with the input; sensor module with sensing element for sensing a physical characteristic and emitting an electrical signal indicative of the physical characteristic being sensed; a signal amplifier module for amplifying said electrical signal emitted by said sensing element and providing an amplified signal adapted to energize said electromagnetic coil for actuating said contact springs; a housing enclosing each module and maintaining each module physically separated from the other remaining modules; circuit terminals secured to said housing and electrically connected to the circuit within the module and enclosed by said housing, said circuit terminals being exposed to the exterior of said housing and providing electrical access to the interior of said housing so that the circuit within any one module is connectable to the circuit within any other module by interconnecting the terminals associated with one housing of the respective modules; a mounting plate for supporting and mounting said modules discretely spaced from each other, said mounting plate having a plurality of openings through which a part of said modules project when in mounted position; module securing means having a first fastening member on said module and having a second fastening member on said plate for securing said module when in mounted position to said mounting plate; and a plate supporting utility member insertable within an opening of a wall of a building and having plate retaining means for retaining and supporting said mounting plate so that a relatively large section of said module projecting from one side of said plate extends into the interior of said utility member, the remaining relatively small section of said module projecting from the other side of said plate and being exposed at the surface of said wall.

2. The electronic circuit arrangement as defined in claim 1 wherein said sensor module includes timing means.

3. The electronic circuit arrangement as defined in claim 1, wherein said sensing element is a photoelectric resistor.

4. The electronic circuit arrangement as defined in claim 1, wherein said sensing element is a thermal resistor sensitive to the temperature of its environment.

5. The electronic circuit arrangement as defined in claim 1, wherein said sensing element is a liquid level indicator.

6. The electronic circuit arrangement as defined in claim 1, wherein said sensing element is a conductivity sensor for sensing the conductivity of a fluid.

7. The electronic circuit arrangement as defined in claim 1, wherein said voltage reducer module comprises further Zener diodes having a threshold level and adapted to limit the half waves of an applied AC voltage; input means connected to said Zener diodes for applying to said diodes an AC voltage; output means connected to said diodes for providing an output voltage signal having a magnitude substantially below the magnitude of the applied voltage; printed circuit board means supporting said diodes, input means and output means and having conductive elements printed on said board for electrically connecting said diodes, input means and output means; and electrical contact means electrically connecting said conductive elements on said circuit board with said circuit terminals and said housing.

8. The electronic circuit arrangement as defined in claim 1 including means for supporting said electromagnetic coil in the vicinity of said contact springs so that the electromagnetic field is generated through energization of said electromagnetic coil actuates said contact springs; and connecting means connecting said contact springs and said coil to said circuit terminals of said housing.

9. The electronic circuit arrangement as defined in claim 1, wherein said amplifier module includes a sensing element within the same module.

References Cited

UNITED STATES PATENTS

| | | | |
|---|---|---|---|
| 1,600,568 | 9/1926 | Smith | 236—9 |
| 1,694,323 | 12/1928 | Jump | 236—9 |
| 2,653,608 | 10/1953 | Valdes | 317—235.30 |
| 2,838,719 | 6/1958 | Chitty | 315—159 XR |
| 2,844,762 | 7/1958 | Duryee | 315—159 |
| 2,992,303 | 7/1961 | Murphy | 335—107 XR |
| 3,021,399 | 2/1962 | Bowman | 200—38 |
| 3,048,833 | 8/1962 | Bernheim | 315—159 |
| 3,184,566 | 5/1965 | Kleinpeter | 335—49 |
| 3,256,479 | 6/1966 | Edwards | 317—99 XR |

LEWIS H. MYERS, Primary Examiner.

J. R. SCOTT, Assistant Examiner.